United States Patent [19]
Alspaugh

[11] 4,341,262
[45] Jul. 27, 1982

[54] ENERGY STORAGE SYSTEM AND METHOD

[76] Inventor: Thomas R. Alspaugh, 4707 Otomi Ave., San Diego, Calif. 92117

[21] Appl. No.: 146,493

[22] Filed: May 5, 1980

[51] Int. Cl.$^3$ .............................................. F28D 17/00
[52] U.S. Cl. .......................................... 165/1; 165/10; 165/133; 165/179; 252/70; 219/325; 219/378; 126/436
[58] Field of Search ..................... 165/104 S, 179, 133, 165/1, 10, 104.11; 252/70; 126/400, 436

[56] References Cited

U.S. PATENT DOCUMENTS

| | | | |
|---|---|---|---|
| 3,062,510 | 11/1962 | Percival | 165/104 S X |
| 3,823,089 | 7/1974 | Ryan et al. | 252/70 |
| 3,996,919 | 12/1976 | Hepp | 165/104 S X |
| 4,231,423 | 11/1980 | Haslett | 165/133 X |

FOREIGN PATENT DOCUMENTS 54-11012  5/1979  Japan .................................. 252/70

*Primary Examiner*—Albert W. Davis
*Attorney, Agent, or Firm*—Gary, Juettner & Pyle

[57] ABSTRACT

An energy storage system of increased conductivity for enhanced receipt, capture, storage, removal and release of energy is provided by dispersing finely divided filaments of highly conductive material throughout chemical energy storage media and causing the conductive filaments to establish a myriad network of highly conductive paths in contact with substantially the entirety of the media and energy exchangers devised to add energy to and remove energy from the media via the conductive paths.

5 Claims, 3 Drawing Figures

ENERGY STORAGE SYSTEM AND METHOD

BACKGROUND OF THE INVENTION

Energy alternatives to conventional energy sources have long been under investigation. Notable among these is solar energy, where considerable achievements have been attained in terms of solar energy collection, but with less than satisfactory results in terms of thermal energy storage.

Substantial efforts have also been expended to utilize conventional energy sources more efficiently and uniformly by storage of energy produced during off-peak periods for subsequent use during peak-use periods. One such proposal involves utilization of electric immersion heaters during off-peak hours to transfer heat to a thermal storage medium for subsequent use in space and water heating. Again, particularly for the individual consumer, off-peak thermal energy storage has remained a major problem.

Thermal energy storage systems in current use include a first category which is reliant upon the specific heat of a storage medium, such as a large body of water or a large mass of rocks or bricks, and a second category which utilizes various chemical storage media that are reliant primarily on the latent heat of fusion of the media. Included within such chemical media are phase change materials and chemical change materials, i.e., materials which undergo physical and/or chemical changes at a given temperature. As is known, the amount of heat required to be added to or removed from a material to effect a physical and/or chemical change (e.g., from solid to liquid) is far greater than that required to merely raise or lower the temperature of the material at any other thermal level. Thus, by relying on the latent heat of fusion, far greater thermal storage capacity can be obtained per unit weight or volume of storage medium. Consequently, chemical storage media, i.e., latent heat of fusion media, offer more potential for the future than specific heat media.

Representative chemical storage media include various salts, salt hydrates, eutectic mixtures, waxes, oils and long chained chemical compounds. A particularly advantageous material for use in domestic, as well as commercial and industrial, thermal energy storage systems is sodium thiosulphate pentahydrate, a relatively common and inexpensive salt hydrate which undergoes a solid/liquid phase change at a temperature of approximately 188 F., with a latent heat of fusion of about 9,360 Btu's per cubic foot. Thus, the material is ideally suited for high density thermal storage for space and water heating, whether the input thereto is thermal energy derived from the sun, off-peak electrical or hydrocarbon energy, or both.

However, the material suffers the disadvantages that it is a poor conductor, heat tends to collect in isolated places, salt hydrates tend to separate or destabilize when in a liquid state thereby mitigating against recycling through the phase change and causing severe loss of heat storage capacity, and so-called "super-cooling", i.e., dropping below the phase change temperature without giving off the previously stored latent heat of fusion.

SUMMARY OF THE INVENTION

The present invention is directed to a method of increasing conductivity between chemical energy storage media and energy exchangers in energy storage systems, thereby to overcome some and to mitigate to a substantial degree other of the previously existing disadvantages of the chemical media; and to an improved energy storage system utilizing chemical media.

In thermal energy storage systems containing chemical media, thermal energy input to the media is provided by either or both of a heat exchanger and a thermo-electric resistance unit immersed in the chemical storage medium, and thermal output or release is obtained by either the same or a separate heat exchanger immersed in the medium. According to the invention, the conductivity of the medium and between the medium and the input and output device or devices is increased by dispersing throughout the medium finely divided filaments of highly conductive material and causing the filaments to contact the input and output device or devices, to contact substantially the entire mass of the storage medium, to contact one another, and to thereby establish a myriad network of highly conductive paths between the input and output device or devices and the entire mass of the storage medium.

The highly conductive filaments rapidly transfer heat energy from an input device to the media and from the media to an output device despite the nonconductive or poorly conductive nature of the media, thereby to decrease the charge and discharge times, or time constant, of the storage system. This results in an ability to fully charge the unit in a shorter period of time with less loss or dissipation of input energy, which is especially advantageous in a solar system operated in a partly cloudy and/or short sun cycle environment. It also results in immediate energy availability when it is desired to withdraw energy from the storage system, as contrasted to the customary reluctant release of energy from poorly conductive storage media.

The increase in conductivity provided by the filaments remains intact through chemical and physical changes in the medium, e.g., in phase change materials, in both their solid and liquid states. In addition, due to the myriad of interconnected conductive paths provided by the filaments, the stored energy is distributed fairly uniformly throughout the entire mass of the media rather than collecting in isolated locations. Consequently, the output heat exchanger or other energy output device is contacted over its entire area by media and filaments all at essentially the same temperature or energy level for most effective utilization of the energy.

The filaments employed according to the invention are preferably aluminum, but they may comprise other highly conductive materials. Likewise, the heat exchanger is preferably aluminum and furthermore is preferably finned to increase its area of contact with the filaments and the media. If the storage medium employed is corrosive to aluminum, and there are some that are and others that are not, the filaments and the heat exchanger are coated with a thin polymer or other coating that prevents corrosive attack without substantial material reduction in the conductivity between the filaments and the media and the heat exchanger.

The finely divided conductive filaments may take any one or more of the forms conventionally available in industry, including expanded metal, mesh, screen, wool, wires, strands, whiskers, threads, fibers, hairs, flakes and powder, as selected for performance of desired functions. For example, expanded metal, mesh or screen attached to the heat exchanger could be used as a stratifying support (as well as a conductor) for the energy storage medium, and the medium itself could be doped or laced with wool, whiskers, hairs and the like.

It is theorized that the incorporation in the medium of multitudinous fine strands of conductive material will, by virtue of their composite large surface area and other physical properties, and their capillary attraction, aid in mitigating separation or destabilization of the storage medium in its liquid state; and that the resultant provision of multitudinous strand or whisker ends and other irregular points and projections within the medium will significantly promote nucleation and crystal formation thereby to prevent so-called "super cooling" of the medium as it passes downwardly through its phase change point. As a consequence, the ability of the medium to be repeatedly cycled is considerably enhanced, and a storage medium of significant longevity in service provided.

Other objects and advantages of the invention will become apparent from the following detailed description, as taken in conjunction with the accompanying drawings.

THE DRAWINGS

DETAILED DESCRIPTION

For purposes of convenience and facility of understanding, preferred embodiments of the present invention have been illustrated largely schematically in the accompanying drawings, and the same will be here described in terms of thermal energy storage systems the input to which and the output from which is derived from a single heat exchanger charged with a thermal transfer liquid such as water or propylene glycol. However, it is to be understood that more than one heat exchanger may be provided, and that other energy exchange devices, such as thermo-electric resistance units, may also be used, all in accordance with the knowledge of the art. For present purposes, these are included in the generic term "energy exchangers". Likewise, the invention will be described in conjunction with a phase change thermal storage medium, specifically sodium thiosulphate pentahydrate, with the understanding that these and other storage media that may be used in accordance with the skill of the art are included within the generic term "chemical energy storage media".

The basic physical concept contemplated by the invention constitutes the addition to a heat storage medium, such as phase change materials, of a highly conductive material compatible with the medium; the conductive material being added to the medium in the form of powder, wire, flakes, hairs, wool, screen, mesh and/or the like in such manner that the heat storage medium constitutes the matrix of an intimate admixture of the medium and the conductors.

A heat exchanger device, preferably a finned thermally conductive tube of the same material as the conductive material in the admixture, either contains or is immersed in the heat storage admixture with the fins thereof in intimate conductive contact with the admixture and the conductive material therein.

The preferred conductive material is aluminum for heat storage media that are or can be rendered compatible therewith i.e., nondestructive thereof, or aluminum coated with a thin corrosion resistant layer, such as a polymer or a plating that is resistant to the media yet exhibits little if any thermal insulating effect.

Figure 1:
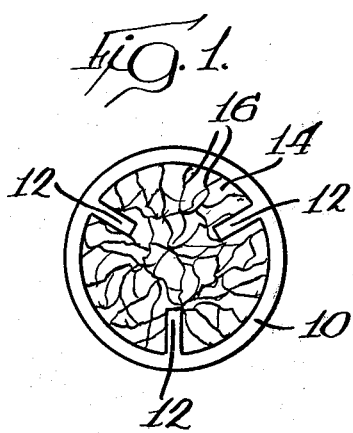
FIG. 1 is a cross-sectional view of an energy storage cylinder or rod provided in accordance with the invention.
Figure 2:
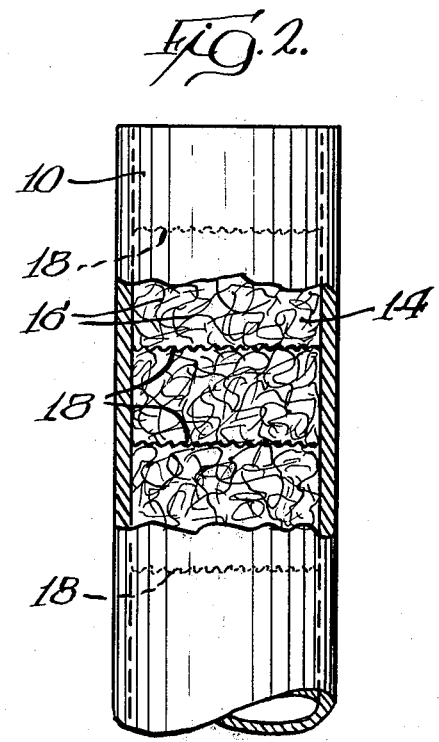
FIG. 2 is an elevation of the rod or cylinder shown in FIG. 1, with a portion thereof broken away to reveal the interior.

Referring to FIGS. 1 and 2, a heat storage rod or cylinder fabricated in accordance with the invention is shown as comprising an aluminum tube 10 closed at both ends and having radially extending fins 12 within the interior thereof, the inner surfaces of the tube and the surfaces of the fins having a thin protective layer of a coating material thereon if necessary, i.e., if required due to the corrosive nature of the heat storage medium. Packed within the tube is an essentially homogenous admixture of a heat storage medium 14 and finely divided filaments 16 of aluminum of other highly conductive material, the conductive material being coated or left uncoated as required according to the nature of the storage medium.

As illustrated in FIG. 2, the admixture 14–16 may if desired be stratified into layers by spaced parallel dividers 18 in the form of highly conductive sheet-like pieces of aluminum screen, mesh or expanded metal, again coated or left uncoated as required. The dividers 18 of screen, mesh or expanded metal intimately contact the internal surfaces of the tube 10 and the surfaces of the fins 12 in good heat exchange contact therewith. If desired, the dividers could be physically and conductively secured to the tube and fins.

The conductive filaments 16 in the admixture preferably take the form of wool, strands, wires, whiskers, threads, fibers and/or hair and may also include flakes and powder. Thin strands or whiskers are desired to provide large composite surface areas, while occupying minimal space and adding minimal weight, for purposes of providing capillary attraction for the heat storage medium when it is in its liquid state. Also, the ends of the strands or whiskers provide points at which nucleation can occur, so that crystal formation should start when the medium drops to its fusion temperature and would normally begin to solidify. To enhance nucleation, flakes and powder are also desirable in the admixture to aid in crystal formation.

It is theorized that the physical characteristics and the capillary attraction provided by thin strands will mitigate separation of the medium when in its liquid state, and thereby maintain the stability of the medium. Also, should separation occur, the thin strands 16 and the mesh dividers 18 will tend to retain the separated constituents of the medium (e.g., sodium thiosulphate dihydrate and water in the case of use of sodium thiosulphate pentahydrate as the energy storage medium) in close proximity to one another for subsequent reconstitution or rehydration. This it is believed will aid materially in alleviating the long-standing problem of separation and the consequent inability to recycle the medium repeatedly through its phase change process. Also, the points defined by the ends of thin strands and particles of flakes and powders should enhance nucleation and crystal formation and effectively prohibit the so-called super cooling phenomenon. In this manner, it is believed that two of the disadvantages of phase change materials, particularly sodium thiosulphate pentahydrate, can be alleviated if not eliminated by practice of the present invention.

Within the admixture 14–16, the filaments 16 intimately contact substantially the entire mass of the heat storage medium 14, and they also contact one another and the screens 18, the interior surfaces of the tube 10 and the surfaces of the fins 12. As a consequence, the filaments 16 and the filaments which form the screen or mesh 18 define a myriad network of thermally conductive paths between the poor conductor storage medium 14 and the aluminum tube 10. Conductivity of the network could be enhanced by positive interconnection, e.g., welding, or by overall integration for example by sonic welding. By virtue of the myriad network of conductive paths thus formed, heat may be rapidly transferred into and released from the heat storage medium via the conductive paths and the exterior surface of the storage cylinder despite the fact the medium itself is not a good conductor. Also, due to the large network of interconnected conductive paths, heat will be distributed substantially uniformly throughout the entire mass of the heat storage medium and the problem of localization of energy storage will be resolved.

In referring to localization and/or isolation of energy storage in prior art systems, particular reference is had to the fact that upon a solid-to-liquid phase change the salt in the immediate vicinity of the heat exchanger would first liquify and that the balance of the salt would later become liquified progressively outwardly from the heat exchanger with considerable reduction in the efficiency of heat transfer. However, the problem on liquid-to-solid phase change is even greater because crystal formation tends to start on the surfaces of the heat exchanger, whereupon a progressively thicker layer of crystals grows on the heat exchanger surfaces which insulates the heat exchanger from the mass of the media and impedes and greatly reduces the efficiency of extraction of heat from the media. The network of conductive paths provided according to this invention maintains good conductivity between all of the media and the heat exchanger even if crystallation should start on the heat exchanger surfaces, thereby preventing thermal isolation of the heat exchanger as in prior art systems.

The heat storage rod or cylinder of FIGS. 1 and 2 can be utilized in a variety of manners. For example, it can be exposed directly to the sun or to a fire (e.g. a domestic fireplace) or other source of energy to soak up heat for subsequent release to a space to be heated after the sun goes down or the fire goes out, or for subsequent immersion in a volume of water to be heated, etc. It can also be immersed in a thermal transfer liquid to receive heat from a solar collection system or another source of thermal energy and to subsequently maintain the liquid up to heat for other purposes, such as to heat water passed through a heat exchanger immersed in the same liquid. Manifestly, the exterior surface of the tube could be finned to aid in heat transfer in any of these useful applications. Likewise, a plurality of the cylinders or rods can be used when, where and as desired. Thus, a fairly universal heat storage device of high efficiency is provided conveniently and economically.

Figure 3:
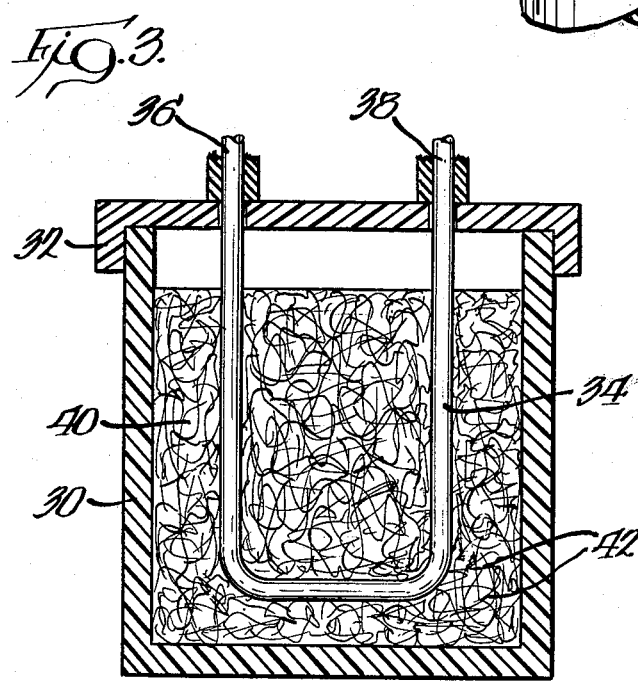
FIG. 3 is a vertical section of an energy storage system provided according to the invention.

Referring to FIG. 3, a thermal energy storage system is disclosed which is, in essence, a physical invention of the cylinder concept. As shown, the system includes a tank or container 30, preferably a nonconductive, well insulated container having an insulated cover 32 and capable of retaining substantial heat, a heat exchanger coil 34 positioned within the container and having insulated inlet and outlet conduits 36 and 38, and an essentially homogenous admixture of a heat storage medium 40 and highly conductive filaments 42 substantially filling the container in intimate contact with the heat exchanger coil 34.

As described in conjunction with FIGS. 1 and 2, the heat exchanger coil could be finned, internally and/or externally, and the admixture 40–42 could be stratified into layers by spaced mesh dividers secured to the heat exchanger. Also as described, the heat exchanger, the filaments and the conductive filaments in the mesh (if used) are preferably aluminum, or aluminum coated with a thin layer of protective coating material if corrosion resistance is desired or required.

The conductive filaments contact substantially the entirety of the mass of the thermal energy storage medium and they also contact one another and the exterior surfaces of the heat exchanger coil, thereby to establish a myriad network of highly conductive paths throughout the admixture and between the medium and the coil. As a consequence, the temperature in the entire mass of the admixture is maintained essentially uniform and heat can be rapidly captured from and released to the heat exchanger coil. In addition, for the reasons previously explained, the heat storage medium is well-stabilized and super cooling thereof is effectively prohibited.

In a typical solar energy thermal storage installation, during the charging cycle, water or propylene glycol heated by a liquid solar collector panel will be pumped via tubing through the heat exchanger immersed in the tank. The typical quality liquid solar collector will heat the liquid heat transfer medium to approximately 140 to 160 degrees F. or higher. As the heated liquid is pumped through the heat exchanger in the tank, the heat is readily and quickly transferred to and absorbed by the salt hydrate crystals, i.e., the crystal of the then solid state sodium thiosulphate pentahydrate. Because the heat energy passing into the salt is substantially above the 118 degree phase change point of sodium thiosulphate pentahydrate, the salt changes phase, i.e., melts and in so doing absorbs approximately 9,360 Btu's of energy per cubic foot of salt. So long as the temperature of the input system remains at or above 118 degrees F., the salt will gradually become and thereafter remain a liquid and store the latent heat of fusion for later release and use.

The charging cycle may continue until the chemicals are fully charged, that is, fully liquified. No damage is done if solar heated transfer liquid continues to circulate through the heat exchanger. The excess heat will merely be stored in the medium as specific heat, that is the temperature of the storage medium will rise above 118 degrees.

Considering that one kilowatt of electrical energy is equal to approximately 3500 Btu's of thermal energy, and that the medium 40 stores specific heat as well as the latent heat of fusion, it is seen that each cubic foot of medium can store very nearly the equivalent of three kilowatts of electrical energy. Thus, for domestic use in particular, the system of FIG. 3 would be very compact and easily accomodated in residences.

To withdraw heat from the thermal storage system, for example for space heating, appropriate valves (not shown) would be manipulated so that the transfer liquid is pumped from the heat exchanger 34 to a space heater (not shown). The transfer liquid will absorb heat stored in the medium as it passes through the changer and exit the tank at close to the temperature of the admixture 40-42, with the major part of the stored heat discharged at the fusion temperature of 118 degrees.

If it is desired to heat water, or to simultaneously insert heat into and remove heat from the medium, the coil 34 may be used as an input heat exchanger and a separate output heat exchanger of essentially the same character may be immersed in the admixture 40-42 for water heating and/or other purposes, the water being drawn off as needed and the remainder of the heat being stored in the storage medium.

The system shown in FIG. 3 is also ideally suited for off-peak electrical energy input, which may be achieved simply by immersing one or more electrical resistance heaters in the admixture 40-42.

The energy storage system of the invention, and the method of making it, are thus shown to be equally and/or simultaneously applicable to solar energy storage and off-peak energy storage and to overcome the disadvantages of many energy storage media.

While preferred embodiments of the invention have been herein illustrated and described, it is to be appreciated that various changes, modifications and rearrangements may be made therein without departing from the scope of the invention, as defined by the appended claims.

What is claimed is:

1. A method of increasing conductivity between chemical energy storage media and energy exchangers in energy storage systems, comprising the steps of coating finely divided filaments of highly conductive material with a protective material for mitigating corrosion of the filaments without materially reducing their conductivity, and dispersing the highly conductive coated filaments throughout the media and causing the filaments to establish highly conductive paths in contact with substantially the entirety of the media and the energy exchanger.

2. In energy storage systems containing chemical energy storage media and energy exchangers in contact with the media, the improvement comprising finely divided filaments of highly conductive material dispersed throughout the storage medium, the conductive filaments including a coating of protective material on the surfaces thereof in contact with the storage medium for mitigating corrosion of the filaments without significantly diminishing their conductivity, the conductive filaments contacting the storage medium, the energy exchanger and one another and facilitating conduction between the energy exchanger and substantially the entirety of the storage medium.

3. In a thermal energy storage system containing a chemical energy storage medium, the improvement comprising an aluminum heat exchanger in contact with the medium and finely divided filaments of aluminum dispersed throughout the medium, the aluminum heat exchanger and filaments including a polymer coating on the surfaces thereof in contact with the medium for mitigating corrosion of the aluminum without significantly diminishing thermal conductivity, the aluminum filaments contacting the medium, the heat exchanger and one another and defining a myriad network of conductive paths between the heat exchanger and substantially the entirety of the medium.

4. A method of mitigating destabilization of chemical energy storage media and increasing conductivity between the chemical energy storage media and energy exchangers in energy storage systems, comprising the steps of dispersing finely divided multitudinous fine strands of highly conductive material through the media, contacting the conductive fine strands with substantially the entirety of the media, the energy exchanger and one another to establish highly conductive paths between substantially the entirety of the media and the energy exchanger, causing the fine strands, by virtue of their composite large surface area, capillary attraction and pointed ends, to mitigate separation, destabilization and supercooling of the media and enhance its useful service life, and stratifying the mixture of the fine strands and the media into layers by inserting therein spaced, generally parallel, sheet-like dividers of highy conductive mesh.

5. In an energy storage system containing chemical energy storage media and energy exchangers in contact with the media, the improvement comprising finely divided multitudinous fine strands of highly conductive material dispersed throughout the storage medium, the highly conductive fine strands contacting the storage medium, the energy exchanger and one another and defining a myriad network of conductive paths facilitating conduction between the energy exchanger and substantially the entirety of the storage medium, the fine strands, by virtue of their composite large surface area, capillary attraction and pointed ends, mitigating separation, destabilization and supercooling of the medium and enhancing the useful service life of the system, and spaced, generally parallel, sheet-like dividers of highly conductive mesh inserted into the mixture of the fine strands and the storage medium and stratifying the mixture into layers.

* * * * *